Feb. 19, 1946.   J. A. MacLEAN, JR   2,395,377
BOLT AND MOUNTING THEREFOR
Filed Aug. 28, 1942
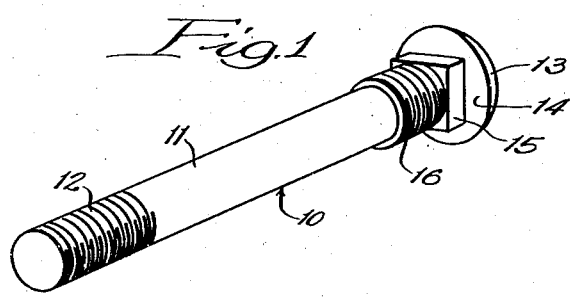
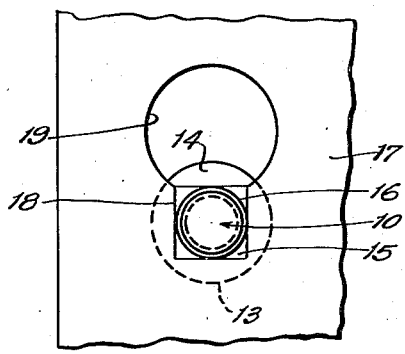
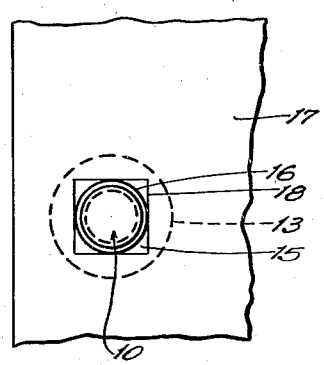
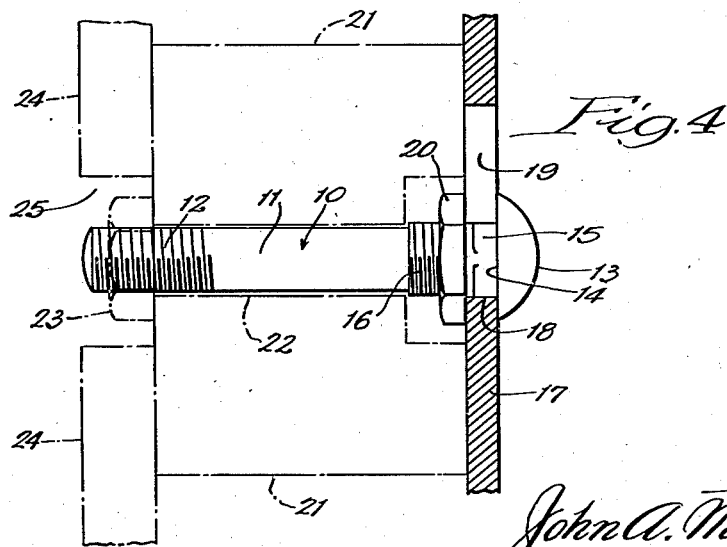
Inventor:
John A. MacLean Jr.,
By McCabe, Hend & Dickinson
Attorneys.

Patented Feb. 19, 1946

2,395,377

UNITED STATES PATENT OFFICE 2,395,377

BOLT AND MOUNTING THEREFOR

John A. MacLean, Jr., Winnetka, Ill., assignor to MacLean-Fogg Lock Nut Company, Chicago, Ill., a corporation of Illinois Application August 28, 1942, Serial No. 456,493

1 Claim. (Cl. 85—9)

My invention relates to bolts and mountings therefor, and more particularly to bolts to be mounted firmly at their head ends in slots in plate-like members to outstand therefrom ready to receive the structures to be mounted upon, or secured by, them.

In some of its aspects my invention is in the nature of an improvement upon the bolt and mounting disclosed in Frederick W. Schultz Patent No. 2,246,457, which issued on June 17, 1941.

One object of my invention is to insure the firmness of the mounting of the bolt in the mounting plate, despite manufacturing variations in the bolt and despite variations in the thickness of the mounting plate or deformations or burrs about the margins of the slot due to the punching of the slot, which have much the same effect as increasing the thickness of the plate at the margins of the slot. In providing for variations in the thickness of the mounting plate, I still am enabled to maintain a firm flatwise contact with both the front and back face of the plate, marginally of the mounting slot, whereby firmly to buttress the bolt against rocking in its mounting.

Another object of the invention is that the locking member employed, although a separate piece, is quickly and readily applied, and the bolt may be installed by inserting it through the plate from either the front or the back thereof, depending upon whether or not there be ample clearance and access to the back side of the plate.

The foregoing, together with further objects, features, and advantages of my invention, are set forth in the following description of specific embodiments thereof illustrated in the accompanying drawing, wherein:

Fig. 1 is a perspective view of the bolt of my invention;

Fig. 2 is a front elevation of a mounting plate having a keyhole shaped opening therein, with the bolt installed in the mounting slot thereof, prior to the application of the anchoring nut;

Fig. 3 is a view similar to Fig. 2, but showing a modified form of mounting slot which does not open into an enlargement or head to give a characteristically keyhole shaped opening;

Fig. 4 is a side elevation of the bolt and a vertical section of the mounting plate, showing the bolt, as mounted, with the anchoring nut installed.

Referring to Fig. 1, the bolt 10 of my invention in its preferred form comprises a shank 11 threaded inwardly from its outer end as indicated at 12, a head 13, like that of a carriage bolt, presenting a forwardly facing shoulder 14 which is normal to the axis of the bolt, a squared neck 15 adjoining the head, and a threaded band 16 adjoining the neck and of a diameter to inscribe the squared neck 15 and yet enough larger in diameter than the shank 11 to permit a nut, to be threaded on the band 16, readily to be passed over the shank 11 and threaded end 12.

Referring to Fig. 2, a mounting plate 17, which may be, for example, the inward flange of an upright of Z shaped cross section framing a steel box car, carries a mounting slot 18 of a size fitting the squared neck 15, which slot opens into an enlargement or head 19, the slot and enlargement together forming a characteristically keyhole shaped hole through the plate, which may come near the edge of the plate as shown.

The enlargement 19 is of a size which will permit the head 13 to be passed therethrough, so that the bolt may be installed in the plate from the side thereof. However, if there is sufficient space behind the plate and that space is sufficiently accessible to a workman, the bolt may be installed from the back by pushing it shank first through the slot in the plate. In such case, as shown in Fig. 3, the mounting slot 18 is a square hole through the plate, without any enlargement such as 19. With the area of the opening through the plate, as well as the overall width thereof, thus minimized, the mounting slot 18 may safely be placed closer to the edge of the plate, as indicated in Fig. 3, than in the instance of the keyhole shaped opening shown in Fig. 2.

In the instance of the keyhole shaped opening in the plate, as in Figs. 2 and 4, the bolt is held at more or less of a normal to the plane of the plate and the head 13 passed through the enlargement 19 to bring the head just beyond the back side of the plate, and then the bolt is moved downwardly to seat the square neck 15 in the mounting slot 18.

To fix the bolt I employ an anchoring nut 20, which is preferably a relatively flat nut. It is adapted for a threaded engagement with the thread 16, but the internal diameter is sufficient to slip readily over the shank, thereby eliminating the time consuming turning of the nut, which would be required if the shank were threaded at uniform diameter all of the way from the free end back to the neck.

The anchoring nut 20 is thus slipped over the outer end of the shank and threaded onto the relatively short threads 16 to draw the head tightly against the back side of the mounting plate so that the plate is firmly pinched between the nut and head, with the back face of the nut and the shoulder 14 of the head making firm flatwise contact wtih its front and back faces respectively marginally of the mounting slot.

As shown in Fig. 4, the axial length of the squared neck 15 is a little less than the thickness of the plate so that there is no danger of the anchoring nut being stopped by the neck before it has accomplished its purpose of pinching the plate between it and the head.

Variations in the thickness of the plate are accommodated by turning the nut farther or not so far onto the thread 16, as the case may be, but without sacrifice of the firmness of the pinching action upon the mounting plate. Within wide limits of thickness variation of the mounting plate, whether due to manufacturing inaccuracies or to the use of different gauges of stock, the back face of the nut and the shoulder 14 of the head are maintained in firm pinching flatwise contact with the respective sides of the mounting plate marginally of the slot.

The bolt is thus mounted firmly in outstanding position normal to the plate ready to receive whatever it is to carry or secure. By way of example, I have illustrated a vertical furring strip 21, having a preformed hole 22 to receive the bolt. A nut 23 is threaded onto the threads 12 to clamp the bolt to the plate. A lining panel or planks 24 may be nailed to the furring strip 21 and other light furring strips. The panel or lining planks 24 preferably carry a hole 25 to provide access to the nut 23 to permit the subsequent removal of the panel or lining boards as a unit along with the furring strip 21.

My bolt 10 provides a certain desirable economy of material, while retaining the desirable feature that the bolt is of increasing cross section toward the head. The increased diameter at the thread 16 buttresses the still larger neck 15 and provides greater cross sectional area and hence greater strength to the shank adjacent its base, where the strain of a rocking movement applied to the free outer end of the bolt may become the greatest. Also, the enlarged diameter of the threads 16, restricted to only the ultimate range of position of the anchoring nut 20, make it unnecessary to thread a considerable portion of the length of the shank between the threads 12 and the threads 16, as shown in Fig. 1. This eliminates considerable time in threading operations, because so much less axial distance of the bolt need be threaded.

The bolt 10 and the locking nut 20 are the same whether the bolt be installed in a mounting slot which constitutes a square hole through the plate, as shown in Fig. 3, or whether the mounting slot be an open ended one which opens into an enlargement 19 or, in the case of a mounting slot formed in the very edge margin of the plate, opens into space. The economy and practical convenience of the use of my bolt is furthered by the consideration that the anchoring nut 20 may be a standard nut.

While I have thus illustrated and described the specific embodiments of my invention, I contemplate that changes and substitutions may be made without departing from the scope or spirit of my invention.

I claim:

The combination of a plate having an opening therethrough with opposed flat side edges; a bolt headed with a transverse shoulder, nut receiving end, intermediate section, threaded band of larger diameter, a neck under the head adjoining the band and having opposite flat sides, the distance between which is as much as the band diameter and of less thickness than the plate; an anchoring nut to engage the threads of the band and seat directly against the plate, so that when assembled the bolt is tightly seated in the opening without relative movement, and a second nut to fit the receiving end.

JOHN A. MacLEAN, Jr.